United States Patent
Luo et al.

(10) Patent No.: US 9,023,477 B2
(45) Date of Patent: May 5, 2015

(54) THERMALLY CONDUCTIVE PAD WITH AN ARRAY OF CARBON NANOTUBES AND METHOD FOR MAKING THE SAME

(75) Inventors: Chun-Xiang Luo, Beijing (CN); Liang Liu, Beijing (CN); Kai-Li Jiang, Beijing (CN); Chang-Hong Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 1186 days.

(21) Appl. No.: 12/005,022

(22) Filed: Dec. 20, 2007

(65) Prior Publication Data

US 2009/0053515 A1      Feb. 26, 2009

(30) Foreign Application Priority Data

Aug. 24, 2007   (CN) .......................... 2007 1 0076571

(51) Int. Cl.
| B32B 9/00 | (2006.01) |
| C08K 7/24 | (2006.01) |
| B82Y 30/00 | (2011.01) |
| C08J 5/00 | (2006.01) |
| C08L 63/00 | (2006.01) |
| C08L 83/04 | (2006.01) |

(52) U.S. Cl.
CPC . C08K 7/24 (2013.01); B82Y 30/00 (2013.01); C08J 5/005 (2013.01); C08K 2201/011 (2013.01); C08L 63/00 (2013.01); C08L 83/04 (2013.01); Y10S 977/742 (2013.01)

(58) Field of Classification Search
CPC .............. C01B 31/022; C01B 31/0293; C01B 2202/00
USPC ................ 428/408; 423/447.1, 445 R, 447.2; 165/185; 977/742
See application file for complete search history.

(56) References Cited

U.S. PATENT DOCUMENTS

| 5,130,201 A | 7/1992 | Yoshimura et al. |
| 6,426,134 B1 | 7/2002 | Lavin et al. |
| 7,592,050 B2 | 9/2009 | Watanabe et al. |
| 7,674,410 B2 | 3/2010 | Huang et al. |

(Continued)

FOREIGN PATENT DOCUMENTS

| CN | 1504407 A | 6/2004 |
| CN | 1676568 A | 10/2005 |

(Continued)

OTHER PUBLICATIONS

Determination of Carbon Nanotube by Gradient Sedimentation by Lu et al. [J. Phys. Chem. B 2006, 110, 24371-34376].

(Continued)

*Primary Examiner* — Daniel H Miller
(74) *Attorney, Agent, or Firm* — Novak Druce Connolly Bove + Quigg LLP

(57) ABSTRACT

The present invention relates to a thermally conductive pad and a method for producing the same. The thermally conductive pad includes an array of carbon nanotubes and a polymer matrix. The array of carbon nanotubes has a density in the approximate range from 0.1 g/cm³ to 2.2 g/cm³. The array of carbon nanotubes is incorporated in the polymer matrix by way of polymerization of a pre-polymer of the polymer matrix in situ. Moreover, the method for producing the thermally conductive pad is also included.

16 Claims, 3 Drawing Sheets

(56) References Cited

U.S. PATENT DOCUMENTS

| | | | |
|---|---|---|---|
| 2001/0052656 A1* | 12/2001 | Newman et al. | 264/176.1 |
| 2004/0105807 A1 | 6/2004 | Fan et al. | |
| 2004/0261987 A1* | 12/2004 | Zhang et al. | 165/183 |
| 2005/0139991 A1* | 6/2005 | White et al. | 257/706 |
| 2005/0167647 A1 | 8/2005 | Huang et al. | |
| 2006/0113510 A1 | 6/2006 | Luo et al. | |
| 2006/0163622 A1* | 7/2006 | Montgomery et al. | 257/264 |
| 2006/0166003 A1 | 7/2006 | Khabashesku et al. | |
| 2007/0015267 A1* | 1/2007 | Da Silva et al. | 435/182 |
| 2007/0099792 A1 | 5/2007 | Khabashesku et al. | |
| 2007/0116626 A1* | 5/2007 | Pan et al. | 423/447.1 |
| 2007/0116957 A1 | 5/2007 | Pan et al. | |
| 2008/0081176 A1 | 4/2008 | Huang et al. | |
| 2008/0274358 A1 | 11/2008 | Spacie et al. | |
| 2008/0292835 A1* | 11/2008 | Pan et al. | 428/98 |
| 2009/0272935 A1 | 11/2009 | Hata et al. | |

FOREIGN PATENT DOCUMENTS

| | | |
|---|---|---|
| CN | 1837147 A | 9/2006 |
| JP | 2004-127713 | 4/2004 |
| JP | 2004-315253 | 11/2004 |
| JP | 2005-61544 | 3/2005 |
| JP | 2006-176362 | 7/2006 |
| JP | 2006-295120 | 10/2006 |
| JP | 2006-527786 | 12/2006 |
| JP | 2007-182352 | 7/2007 |
| JP | 2007-204301 | 8/2007 |
| JP | 2007-523818 | 8/2007 |
| JP | 2009-517321 | 4/2009 |
| TW | 200536885 | 11/2005 |
| TW | 200708241 | 2/2007 |
| WO | WO2005028174 | 3/2005 |
| WO | WO2005028740 | 3/2005 |

OTHER PUBLICATIONS

Don N. Futaba et al.Shape Engineerable and Highly Densely Packed Single Walled Carbon Nanotubes and their Application as Super-Capacitors Electrodes, Nature Materials 5, 987-994 (2006).

* cited by examiner

THERMALLY CONDUCTIVE PAD WITH AN ARRAY OF CARBON NANOTUBES AND METHOD FOR MAKING THE SAME

RELATED APPLICATIONS

This application is related to common-assigned applications entitled, "METHOD FOR MAKING COMPOSITE MATERIAL WITH A HIGH-DENSITY ARRAY OF CARBON NANOTUBES", filed Dec. 20, 2007 Ser. No. 12/004,672; "HIGH-DENSITY ARRAY OF CARBON NANOTUBES AND METHOD AND APPARATUS FOR MAKING THE SAME", filed Dec. 20, 2007 Ser. No. 12/004,674. Disclosures of the above-identified applications are incorporated herein by reference.

BACKGROUND OF THE INVENTION

1. Field of the Invention

The invention relates to thermally conductive pads and, particularly, to a thermally conductive pad with an array of carbon nanotubes and a method for making the same.

2. Description of Related Art

Since the report of their discovery in 1991 by Iijima, carbon nanotubes (CNTs) have been extensively studied for their structural, physio-chemical, mechanical, electrical, and electromechanical properties. Many potential technological applications have been proposed including hydrogen storage, nanoelectronic devices, field emission displays (FED), field emission microscopy (FEM), chemical sensors, and so on. Carbon nanotubes are desirable, at least in part, due to their unique electrical and mechanical properties. Currently, the study of carbon nanotube/polymer composite materials is gaining significant attention. Such nanotube-reinforced composite materials have broad applications because of their good antistatic performance, microwave absorbing capability, electromagnetic shielding ability, and so on.

Generally speaking, composite materials with carbon nanotubes have been prepared via an in-situ polymerization process, a solution compounding process, and/or a melt compounding process.

Carbon nanotubes arrays have excellent mechanical strength and good heat conductivity and/or heat diffusivity, as such they have been used to produce heat conductive materials and reinforced composite materials. However, the density of the carbon nanotubes in the composite material effects the mechanical strength and the heat conductivity of the composite material.

Currently, the technology for chemical vapor deposition (CVD) method for producing/making carbon nanotube arrays has reached a mature state. However, the carbon nanotube arrays directly produced or grown by the CVD method have a density of less than 0.01 grams per cubic centimeter ($g/cm^3$). Thus, the carbon nanotube arrays are not tightly bounded to each other, and the spacings between the carbon nanotubes are in the order of several times the diameter of the carbon nanotubes. Furthermore, the density of the carbon nanotube arrays directly grown by the CVD method is difficult to change and/or control. As such, composite materials containing low-density carbon nanotube arrays have poor thermal conductivity. Thereby, the composite materials may not achieve the desirable effects required of thermally conductive composite materials.

Further, a thermally conductive pad can be obtained by cutting the above-described thermal conductive composite material. However, the thermally conductive pad has a low coefficient of thermal conductivity. Thus, the thermally conductive pad is restricted in its use in the thermal conductive field.

What is needed, therefore, is to provide a thermally conductive pad with a high-density array of carbon nanotubes, and a method for producing the same that is very simple and efficient and the density of carbon nanotubes therein is easily controlled during the production process.

SUMMARY OF THE INVENTION

A thermally conductive pad includes an array of carbon nanotubes and a polymer matrix. The array of carbon nanotubes has a density in the approximate range from 0.1 $g/cm^3$ to 2.2 $g/cm^3$. The array of carbon nanotubes is incorporated in the polymer matrix by way of polymerization of a pre-polymer of the polymer matrix in situ.

Other advantages and novel features of the present thermally conductive pad and the method for making the same will become more apparent from the following detailed description of preferred embodiment when taken in conjunction with the accompanying drawings.

DETAILED DESCRIPTION OF THE INVENTION

Reference will now be made to the drawings to describe, in detail, embodiments of the thermally conductive pad with the array of carbon nanotubes and the method for making the same.

In one present embodiment, a thermally conductive pad includes an array of carbon nanotubes and a polymer matrix. The array of carbon nanotubes has a density in the approximate range from 0.1 $g/cm^3$ to 2.2 $g/cm^3$. The array of carbon nanotubes is incorporated in the polymer matrix by way of polymerization of a pre-polymer of the polymer matrix in situ. The carbon nanotubes are densely packed and aligned. The polymer matrix has a first surface and a second surface opposite to the first surface, and the carbon nanotubes being substantially parallel to each other and extending between the first and second surfaces. Each carbon nanotube has two open ends (i.e. a first open end and a second open end opposite to the first open end). The carbon nanotubes protrude out from at least one of the first and second surfaces of the polymer matrix. A thickness of the thermally conductive pad is in the approximate range from the 20 micrometers to 5 millimeters.

Figure 1:
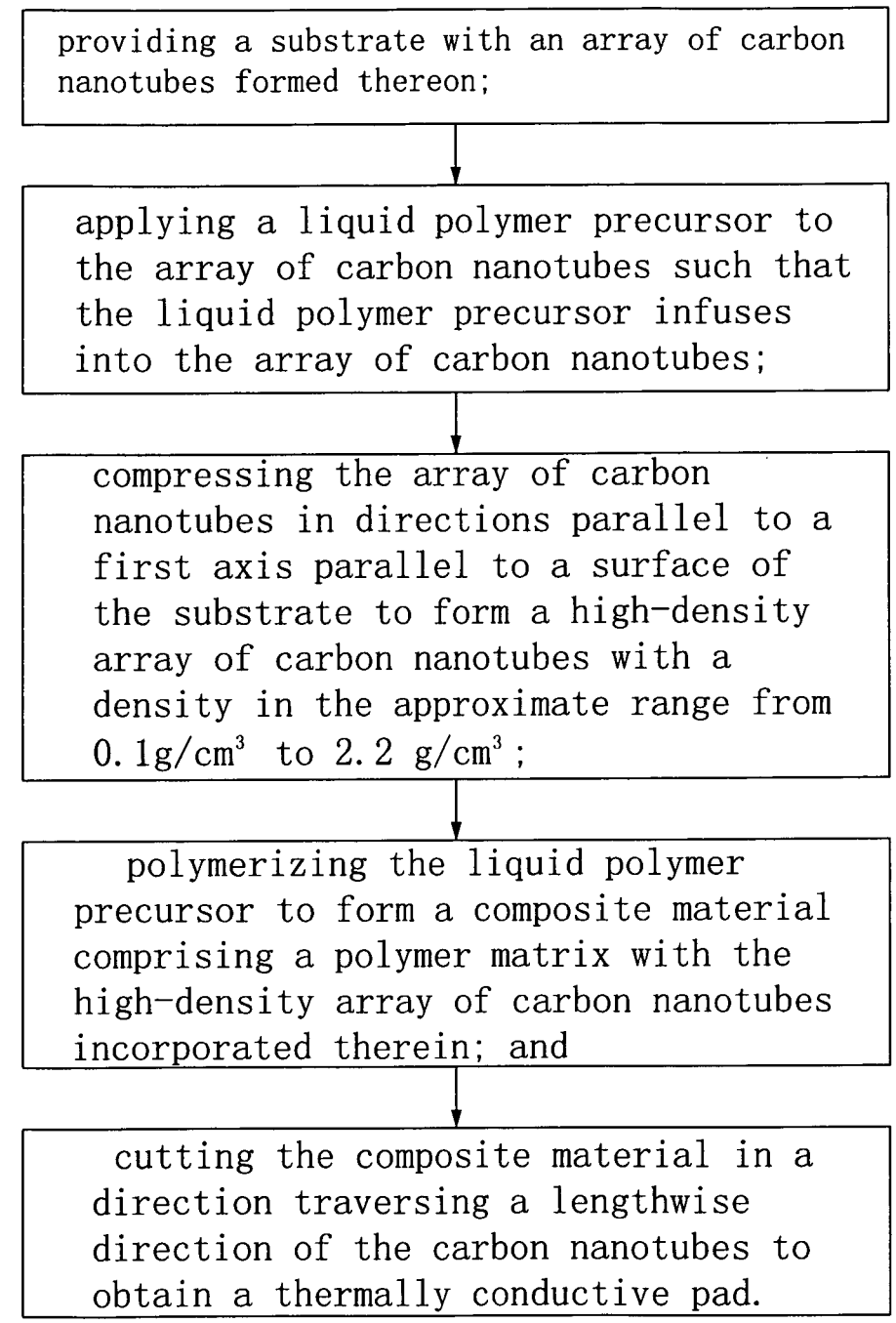
FIG. 1 is a flow chart of a method for producing a thermally conductive pad with an array of carbon nanotubes, in accordance with a present embodiment of the present invention.

In another embodiment, referring to FIG. 1, a method for producing the above-described thermally conductive pad of silicone rubber and a high-density array of carbon nanotubes includes the following steps: (a) providing a substrate with an array of carbon nanotubes formed thereon; (b) applying a liquid polymer precursor to the array of carbon nanotubes such that the liquid polymer precursor infuses into the array of carbon nanotubes; (c) compressing the array of carbon nanotubes in directions parallel to a first axis parallel to a surface of the substrate to form a high-density array of carbon nanotubes with a density in the approximate range from 0.1 g/cm³ to 2.2 g/cm³; (d) polymerizing the liquid polymer precursor to form a composite material comprising a polymer matrix with the high-density array of carbon nanotubes incorporated therein; and (e) cutting the composite material in a direction traversing a lengthwise direction of the carbon nanotubes to obtain a thermally conductive pad.

In step (a), the array of carbon nanotubes can be formed by the steps of: (a1) providing a substrate; (a2) forming a catalyst layer on the substrate; (a3) annealing the substrate with the catalyst layer; (a4) heating the annealed substrate in a furnace; and (a5) supplying a mixture of a carrier gas and a carbon source gas in the furnace and thereby growing the array of the carbon nanotubes from the substrate via the catalyst layer.

In step (a1), the substrate could, opportunely, be selected from a P-type silicon wafer, a N-type silicon wafer, a wafer of quartz, and glass. Quite usefully, a four-inch P-type silicon wafer is used as the substrate.

In step (a2), the catalyst can, advantageously, be made of iron (Fe), cobalt (Co), nickel (Ni), or any combination alloy thereof. In one embodiment, Fe is selected as the catalyst. A thickness of the Fe catalyst layer is in the approximate range from 0.5~5 nanometers (nm). Quite usefully, in the present embodiment the thickness of the Fe catalyst layer is 1 nm. Furthermore, the process for forming the catalyst layer is, beneficially, by electron beam vapor deposition method or magnetron sputtering method.

In step (a3), annealing the catalyst layer is at a temperature of 300° C. for about 0.2~12 hours, forming oxide particles on the catalyst layer.

In step (a4), the furnace is filled with a protective gas. The foregoing substrate in the furnace is heated up to a predetermined temperature in the range of 600~1000° C. The protective gas can, beneficially, be nitrogen ($N_2$) or a noble gas. Quite usefully, Argon (Ar) is selected to act as the protective gas in the present embodiment.

In step (a5), the carrier gas can, beneficially, be nitrogen ($N_2$) or a noble gas. The carbon source gas can, advantageously, be ethylene ($C_2H_4$), methane ($CH_4$), acetylene ($C_2H_2$), ethane ($C_2H_6$), or any combination thereof. Quite suitably, the carrier gas is hydrogen ($H_2$), and the carbon source gas is acetylene in the present embodiment. After the mixture of the carrier gas and the carbon source gas reacts with catalyst for about 0.1~2 hours, an array of carbon nanotubes is formed on the catalyst layer of the substrate.

The array of carbon nanotubes, opportunely, includes a plurality of carbon nanotubes parallel to each other and approximately perpendicular to the substrate. The array of carbon nanotubes formed under the above conditions is essentially free of impurities such as carbonaceous or residual catalyst particles. The carbon nanotubes in the array are packed together closely by van der Waals attractive force. It is to be understood that the process of making/growing the array of carbon nanotubes is not limited to the above-described method. Other methods for growing the array of carbon nanotubes can also be used to grow the array related in the step (a). The carbon nanotubes in the array of the carbon nanotubes could be selected from the group consisting of single-walled carbon nanotubes, double-walled carbon nanotubes, and multi-walled carbon nanotubes.

In step (b), the liquid polymer precursor is selected from the group consisting of silicone rubber, pouring sealant, epoxy resin, and paraffin. Furthermore, the liquid polymer precursor includes a low viscosity polymer liquid formed by the method of polymerizing, dissolving, and/or melting.

In the embodiment, the liquid polymer precursor is silicone rubber solution. A process of preparing the silicon rubber solution includes the steps of: mixing acetic ester with silicone rubber to form a composite; and stirring the composite to form a silicon rubber solution.

Figure 2:
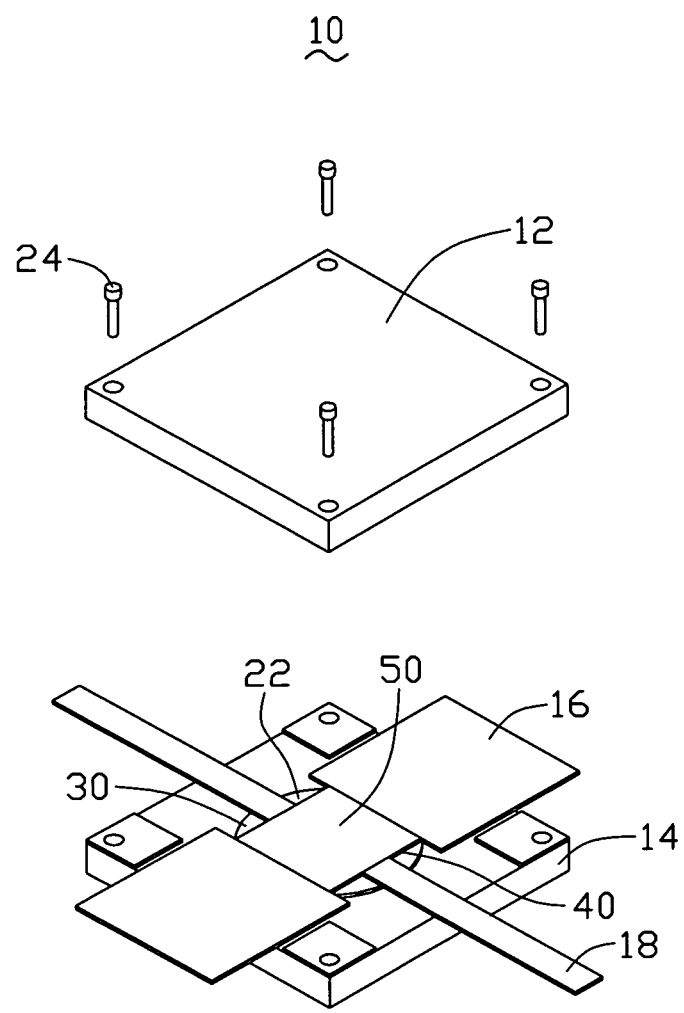
FIG. 2 shows a schematic diagram of an apparatus for producing a composite material with the array of carbon nanotubes, in accordance with the present embodiment.
Figure 3:
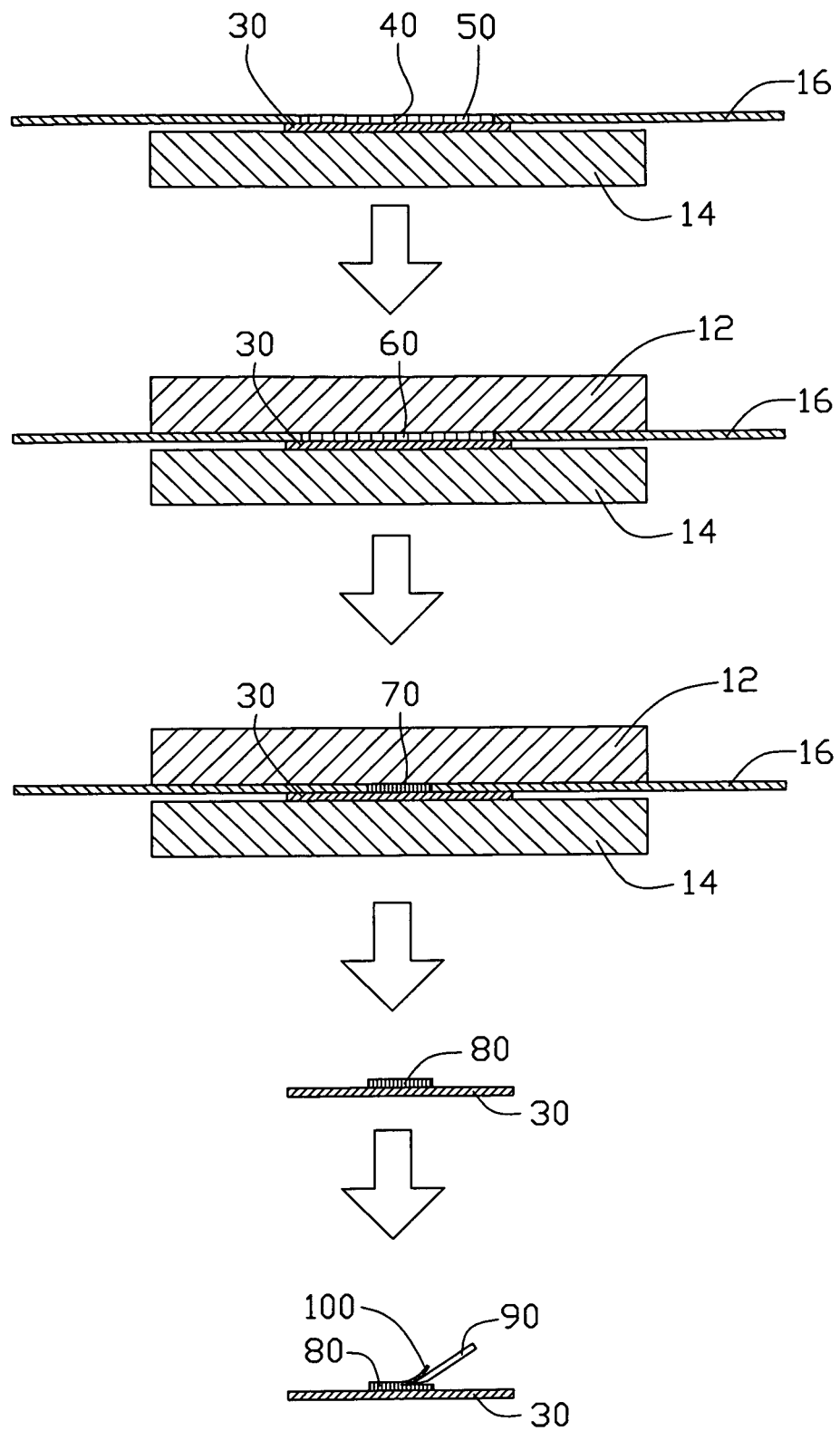
FIG. 3 is a process chart of fabricating a thermally conductive pad with the array of carbon nanotubes, in accordance with the present embodiment.

In step (b), the liquid polymer precursor is infused into the array of carbon nanotubes to form an array of carbon nanotubes with polymer precursor 60 in an apparatus. Referring to FIG. 2, the apparatus 10 includes an upper board 12, a lower board 14, two first sideboards 16, and two second sideboards 18. The upper board 12 parallel to the lower board 14, and is spaced a distance from the lower board 14 and fixed relative to the lower board 14. Further, the upper board 12 and lower board 14 are configured for sandwiching therebetween a substrate 30 with an array of carbon nanotubes 60 infused polymer precursor. The two opposite first sideboards 16 is inserted between the upper board 12 and the lower board 14, and configured for compressing the array of carbon nanotubes 60 infused polymer precursor in directions parallel to a first axis parallel to the surface of the substrate 30. The two opposite second sideboards 18 is inserted between the upper board 12 and the lower board 14, and configured for compressing the array of carbon nanotubes 60 infused polymer precursor in directions parallel to a second axis parallel to the surface of the substrate 30. The upper board 12 is fixed to the lower board 14 by screws 24. The first sideboards 16 are configured for being disposed at opposite sides of the array of carbon nanotubes 40 in directions parallel to the first axis; and the second sideboards 18 are configured for being disposed at opposite sides of the array of carbon nanotubes 40 in directions parallel to the second axis. The first axis is perpendicular to the second axis.

A process of infusing the liquid polymer precursor 50 into the array of carbon nanotubes 40 includes the steps of: (b1) putting/placing the substrate 30 with the array of carbon nanotubes 40 formed thereon in the apparatus 10; and (b2) dropping the liquid polymer precursor 50 onto the array of carbon nanotubes 40 to infuse into the carbon nanotubes 40 and thereby forming an array of carbon nanotubes 60 infused with polymer precursor.

In step (b1), a process of putting the substrate 30 with the array of carbon nanotubes 40 formed thereon in the apparatus 10 is described in detail. Firstly, the first sideboards 16 and the second sideboards 18 are arranged on the backboard 14, thereby defining a space 22 in the center of the backboard 14. Secondly, the substrate 30 formed the array of carbon nanotubes 40 is put/placed in the space 22.

In step (b2), a process of dropping the liquid polymer precursor 50 onto the array of carbon nanotubes 40 is described in detail. Firstly, the liquid polymer precursor 50 is dropped onto the array of carbon nanotubes 40 placed in the space 22. Secondly, the front board 12 is fixed on the first sideboards 16 and the second sideboards 18.

Further, a step (b3) of vacuumizing in the apparatus 10 is further provided. Specifically, the array of carbon nanotubes infused with polymer precursor 60 is compressed in a vacuum chamber. Moreover, the step (b3) can be executed after the step (b2). After the vacuumizing process, a degree of vacuum in the closed space 22 is/maintains at less than 0.2 atmospheric pressures (atm). The specific degree of vacuum of the closed space 22 and the duration of the time of the vacuumizing process can, opportunely, be selected according to practical needs. The vacuumizing process enables air bubbles to be released from the array of carbon nanotubes 40, and thereby the liquid polymer precursor 50 can fully fill the gaps between the carbon nanotubes. As such, the liquid polymer precursor 50 is infused into the array of carbon nanotubes 40, thereby forming the array of carbon nanotube with polymer precursor 60. It is to be noted that the process of forming the array of carbon nanotube with polymer precursor 60 can also be as follows. The array of carbon nanotubes 40 and the liquid polymer precursor 50 can be mixed and vacuumized in other devices, such as a watch glass. After the vacuumizing step, the liquid polymer precursor 50 fully fills the gaps in the array of carbon nanotubes 40, thus the array of carbon nanotube with polymer precursor 60 is formed. It is to be understood that the array of carbon nanotube with polymer precursor 60 formed in other devices (e.g., watch glass) needs to be put in the apparatus 10 before executing the step (c).

In step (c), the process of compressing the array 40 includes the following steps. Firstly, the array 60 is fixed on the lower board 14 by the second sideboards 18, thereby being configured for sandwiching therebetween. Secondly, the fixed array 60 is compressed through the first sideboards 16 by the relative movement along the first axis. With the degree of compressing increased, the space between the carbon nanotubes within the array 60 is decreased in the first axis.

After step (c), the process of step (c') is further provided. The step (c') is the step of compressing the array of carbon nanotubes 60 in directions parallel to a second axis parallel to the surface of the substrate 30 to form the high-density array of carbon nanotubes 70, the second axis being perpendicular to the first axis.

In step (c'), the process of compressing the array 60 includes the following steps. Firstly, the array 60 is fixed on the lower board 14 by the first sideboards 16, thereby being configured for sandwiching therebetween. Secondly, the fixed array 60 is compressed through the second sideboards 18 by the relative movement along the second axis to form a high-density array of carbon nanotubes 70. With the degree of compressing increased, the space between the carbon nanotubes within the array 60 is decreased in the second axis.

Through the compressing in the first and second axis, the density of the carbon nanotubes in the array 60 reaches a predetermined level, and thereby forms a high-density array of carbon nanotubes 70. It is to be understood that the density of the array 60 is increased, when the degree of the compressing is increased. As such, the density of the array 70 in the embodiment is controllable by controlling the degree of the compressing in the first and second directions.

In step (d), a solidifying agent is added to the liquid polymer precursor 50 before the step (b) to polymerize the liquid polymer precursor 50. The amount of the solidifying agent is selected to make solidifying time of the liquid polymer precursor 50 more than two hours. A process of solidifying the above-described liquid polymer precursor 50 is executed by heating at a raised temperature or by disposing at room temperature. After the polymerizing process, the composite material 80 compressing a polymer matrix with the high-density array of carbon nanotubes incorporated therein is formed.

The solidifying agent includes epoxy agent, alkaline solidifying agent and acid solidifying agent. The alkaline solidifying agent includes aliphatic diamine, aromatic polyamines, modified fatty amines and other nitrogen compounds. The acidic solidifying agent includes organic acid, acid anhydride, boron trifluoride, or compound thereof.

Thermal conductivity of the composite material 80 containing silicon rubber and the high-density array of carbon nanotubes is about 3 watts/meter K (W/mK). However, thermal conductivity of the composite material containing silicon rubber and the array of carbon nanotubes directly produced by CVD method is only about 1 W/mK. The density of the array of carbon nanotubes in the composite material 80 is about 10 to 200 times that of the array of carbon nanotube directly produced by CVD method. Therefore, the composite material 80 has excellent thermal conductivity.

In addition, the composite material 80 is filled with silicone rubber between the gaps of the carbon nanotubes. This makes connections between the carbon nanotubes more stable than in a pure array of carbon nanotubes. As such, the above-described composite material 80 has excellent mechanical properties and is useful in the field of thermal conductivity.

It is to be understood that the method for making the composite material 80 with high-density array of carbon nanotubes can also be produced by the following process. Firstly, the array of carbon nanotubes is compressed to form a high-density array of carbon nanotubes. Secondly, the high-density array of carbon nanotubes is mixed with the liquid polymer precursor to form a composite of the liquid polymer precursor and the high-density array of carbon nanotubes. Thirdly, the composite of the liquid polymer precursor and the high-density array of carbon nanotubes are polymerized to form a composite material 80 with the high-density array of carbon nanotubes.

In step (e), a knife 90 is used to cut the composite material 80 into a thermally conductive pad 100 along a direction vertical to axes of the carbon nanotubes. Further, some surface treatments can be adopted to the thermally conductive pad 100. The process of the surface treatment is selected from the group consisting of plasma etching, chemical modification, and metal deposition.

It is to be understood that different processes of specific surface treatment can enhance the thermal conductivity of the thermally conductive pad 100 by different principles. For example, if the thermally conductive pad 100 is etched by plasma, the two ends of carbon nanotubes in the thermally conductive pad 100 are made to fully extend out the two opposite surfaces of the thermally conductive pad 100. Therefore, the etched thermally conductive pad 100 will have more excellent properties of thermal conductivity. If the thermally conductive pad 100 is treated by chemical modification, chemical groups can be absorbed at the two ends of the carbon nanotubes extended out of the thermally conductive pad 100. Therefore, the modified thermally conductive pad 100 can have more excellent thermal conductivity properties. If the thermally conductive pad 100 is treated by metal deposition, the thermally conductive pad 100 will have a large contact surface area and have a good connection with the thermal source. Therefore, the thermally conductive pad 100 with deposited metal will have more excellent properties of thermal conductivity.

Compared with the conventional thermally conductive pad, the thermally conductive pad 100 employs a high-density array of carbon nanotubes thereby having the following virtues. Firstly, the carbon nanotubes in the thermally conductive pad 100 are very densely packed and aligned, and the density of the array of carbon nanotubes used in the thermally conductive pad 100 is about 10~200 times greater that that directly produced by the CVD method. Thus, the thermally conductive pad 100 is a wise application choice in the field of thermal conductivity. Secondly, in the thermally conductive pad 100, the high-density array of carbon nanotubes is filled with the polymer matrix. Thus, the connections of the carbon nanotubes are more stable than in a pure array of carbon nanotubes, and thereby the thermally conductive pad 100 has more excellent mechanical properties. Thirdly, the polymer matrix has two surfaces (i.e. a first surface and a second surface opposite to the first surface). Each carbon nanotube has two open ends (i.e. a first open end and a second open end opposite to the first open end). Further, the first open end extends out of the first surface of the polymer matrix. The second open end extends out of the second surface of the polymer matrix. Therefore, the thermally conductive pad 100 has a high coefficient of thermal conductivity. Fourthly, the thermally conductive pad 100 is very simply and efficiently produced by the method and the density of carbon nanotubes therein is easily controlled during the production process.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for producing a thermally conductive pad, the method comprising:
   (a) providing an apparatus, and a substrate with an array of carbon nanotubes formed on a surface of the substrate, wherein the array of carbon nanotubes comprises a plurality of carbon nanotubes parallel to each other and approximately perpendicular to the surface of the substrate, the apparatus comprises an upper board, a lower board, two first sideboards spaced from and facing each other, and two second sideboards spaced and facing each other; the upper board is spaced from and parallel to the lower board; the two first sideboards and the two second sideboards are located between the upper board and the lower board; the two first sideboards are configured to compress in directions parallel to a first axis; the two second sideboards are configured to compress in directions parallel to a second axis; the first axis and the second axis are perpendicular to each other and parallel to the surface of the substrate;
   (b) applying a liquid polymer precursor to the array of carbon nanotubes;
   (c) compressing the array of carbon nanotubes in a first and a second directions perpendicular to a lengthwise direction of the plurality of carbon nanotubes to form a high-density array of carbon nanotubes by the apparatus, wherein the first direction is perpendicular to the second direction;
   (d) polymerizing the liquid polymer precursor to form a composite material comprising a polymer matrix with the high-density array of carbon nanotubes incorporated therein; and
   (e) cutting the composite material in a direction traversing the lengthwise direction of the carbon nanotubes to obtain the thermally conductive pad.

2. The method as claimed in claim 1, wherein step (b) comprises a step of dropping the liquid polymer precursor into the array of carbon nanotubes.

3. The method as claimed in claim 1, wherein the array of carbon nanotubes is compressed in a vacuum chamber.

4. The method as claimed in claim 3, wherein a pressure of the vacuum chamber is less than 0.2 atmospheric pressures.

5. The method as claimed in claim 1, wherein the liquid polymer precursor contains a solidifying agent.

6. The method as claimed in claim 5, wherein the solidifying agent comprises epoxy agent, alkaline solidifying agent and acid solidifying agent; and the alkaline solidifying agent comprises at least one of aliphatic diamine, aromatic polyamines, modified fatty amines, and other nitrogen compounds, and the acid solidifying agent comprises at least one of organic acid, acid anhydride, boron trifluoride, and a complex of them.

7. The method as claimed in claim 1, further comprising a step of solidifying the polymerized polymer precursor at room temperature or at a raised temperature.

8. The method as claimed in claim 1, wherein at least one surface of the composite material is treated using plasma etching to extend at least one end of the carbon nanotubes out the at least one surface of the composite material.

9. The method as claimed in claim 1, wherein at least one surface of the thermally conductive pad is treated using chemical modification to form chemical groups on at least one end of the carbon nanotubes.

10. The method as claimed in claim 1, wherein at least one surface of the composite material is treated using metal deposition to deposit metal on at least one end of the carbon nanotubes.

11. A method for producing a thermally conductive pad, the method comprising:
    (a) providing an apparatus, and a substrate with an array of carbon nanotubes formed on a surface of the substrate, wherein the array of carbon nanotubes comprises a plurality of carbon nanotubes parallel to each other and approximately perpendicular to the surface of the substrate, the apparatus comprises an upper board, a lower board, two first sideboards spaced from and facing each other, and two second sideboards spaced and facing each other; the upper board is spaced from and parallel to the lower board; the two first sideboards and the two second sideboards are located between the upper board and the lower board; the two first sideboards are configured to compress in directions parallel to a first axis; the two second sideboards are configured to compress in directions parallel to a second axis; the first axis and the second axis are perpendicular to each other and parallel to the surface of the substrate;
    (b) applying a liquid polymer precursor to the array of carbon nanotubes;
    (c) compressing the array of carbon nanotubes in a first and a second directions perpendicular to a lengthwise direction of the plurality of carbon nanotubes to form a high-density array of carbon nanotubes with a density in a range from about 0.1 g/cm$^3$ to about 2.2 g/cm$^3$ by the apparatus, wherein the first direction is perpendicular to the second direction;
    (d) polymerizing the liquid polymer precursor to form a composite material comprising a polymer matrix with the high-density array of carbon nanotubes incorporated therein; and
    (e) cutting the composite material in a direction traversing the lengthwise direction of the carbon nanotubes to obtain the thermally conductive pad.

12. The method as claimed in claim 11, wherein the array of carbon nanotubes infused with the liquid polymer precursor is compressed in a vacuum chamber.

13. The method as claimed in claim 12, wherein a degree of vacuum in the vacuum chamber is less than 0.2 of standard atmospheres.

14. The method as claimed in claim 11, wherein the liquid polymer precursor contains a solidifying agent.

15. The method as claimed in claim 12, wherein the solidifying agent comprises a first material that is selected from the group consisting of epoxy agent, alkaline solidifying agent and acid solidifying agent; and the alkaline solidifying agent comprises a second material that is selected from the group consisting of aliphatic diamine, aromatic polyamines, modified fatty amines and other nitrogen compounds, and the acidic solidifying agent comprises a third material that is selected from the group consisting of organic acid, acid anhydride and boron trifluoride.

16. The method as claimed in claim 11, wherein at least one surface of the thermally conductive pad is treated using chemical modification to form chemical groups on at least one end of the carbon nanotubes.

* * * * *